United States Patent
Kreidler et al.

(10) Patent No.: US 9,748,816 B2
(45) Date of Patent: Aug. 29, 2017

(54) AXIAL FLUX ELECTRIC MACHINE INCLUDING AN INTEGRAL BRAKE AND METHODS OF ASSEMBLING THE SAME

(71) Applicant: Regal Beloit America, Inc., Beloit, WI (US)

(72) Inventors: Jason Jon Kreidler, Sheboygan Falls, WI (US); Wesley Kenneth Anderson, Cedarburg, WI (US); Norman Carl Golm, Jr., Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 671 days.

(21) Appl. No.: 14/222,095

(22) Filed: Mar. 21, 2014

(65) Prior Publication Data
US 2015/0270760 A1    Sep. 24, 2015

(51) Int. Cl.
*H02K 7/102* (2006.01)
*H02K 21/24* (2006.01)
*H02K 21/02* (2006.01)
*H02K 7/12* (2006.01)

(52) U.S. Cl.
CPC ......... *H02K 7/1021* (2013.01); *H02K 7/1028* (2013.01); *H02K 7/125* (2013.01); *H02K 21/028* (2013.01); *H02K 21/24* (2013.01); Y10T 29/49009 (2015.01)

(58) Field of Classification Search
CPC ...... H02K 7/1021; H02K 21/24; H02K 7/125; H02K 7/1028; H02K 21/028
USPC .................. 310/79, 77, 92, 93, 123, 268
See application file for complete search history.

(56) References Cited

U.S. PATENT DOCUMENTS

| 4,130,188 A * | 12/1978 | Askew ............... F16D 55/28 188/156 |
| 8,288,914 B2 * | 10/2012 | Qin .................... H02K 1/17 310/154.03 |
| 8,857,578 B2 * | 10/2014 | Bogdanowicz ...... H02K 49/043 188/163 |
| 2002/0190581 A1 * | 12/2002 | Gass ................... B23D 47/12 307/326 |
| 2003/0184177 A1 * | 10/2003 | Enzinna ............... H02K 7/125 310/93 |
| 2010/0253085 A1 * | 10/2010 | Minowa ............... F03D 9/002 290/55 |
| 2011/0140557 A1 * | 6/2011 | Miyairi ............. F16H 25/2454 310/77 |

(Continued)

FOREIGN PATENT DOCUMENTS

| WO | 9709770 A1 | 3/1997 |
| WO | 2008006906 A1 | 1/2008 |

*Primary Examiner* — Naishadh Desai
(74) *Attorney, Agent, or Firm* — Armstrong Teasdale LLP

(57) ABSTRACT

An axial flux electric machine has a rotatable shaft, a fixed stator core comprising a ferromagnetic material and defining an axis of rotation, and a rotor assembly comprising a plurality of permanent magnets. The rotor assembly is rotatable about the axis of rotation. An axial air gap is defined between the stator core and the rotor assembly. The rotor assembly is axially displaceable towards and away from the stator core. The rotor assembly has a first position wherein the axial gap is a predetermined width greater than zero, and a second position wherein the axial gap is zero, such that the rotor assembly and the stator core contact each other.

18 Claims, 17 Drawing Sheets

(56) References Cited

U.S. PATENT DOCUMENTS

2012/0025534 A1* 2/2012 Miyamoto ............ H02K 1/2746
290/55
2012/0133231 A1* 5/2012 Hayakawa ............. H02K 21/24
310/156.37

\* cited by examiner

AXIAL FLUX ELECTRIC MACHINE INCLUDING AN INTEGRAL BRAKE AND METHODS OF ASSEMBLING THE SAME

BACKGROUND OF THE INVENTION

The field of the invention relates generally to an electrical machine having a brake, and more specifically, to an axial flux electrical machine that includes an integral braking mechanism.

One of many applications for an electric motor is to operate a hoist or a lift. The electric motor may be configured to rotate a gearbox and/or a pulley system including a drum, a lifting cable, etc., which lifts and lowers a load. In general, the lifting cable is wound onto the drum via operation of the electric motor provided in the hoist or lift, such that an object attached to the cable is lifted. The object may then be placed at a target location by unwinding the lifting cable from the drum by operation of the electric motor, thereby enabling the object to be lowered onto the target location.

In general, electric motors used in hoists or lifts require a brake that is automatically engaged upon deactivation of the electric motor and disengaged upon activation of the electric motor. The brake may function to stop a moving load (dynamic braking) and to hold the load in place (static braking) while it is being positioned at the target location. The brake may also function as a safety device to keep the load from falling should the electric motor lose electrical power. Typically, the brake is an add-on component to the electric motor. As a result, typical electric motor brakes add significant length and weight to the electric motor, thereby increasing the size and weight of the hoist or lift. Furthermore, an add-on motor brake may increase the costs associated with the hoist or lift system.

A common motor used in such hoist and lift systems is a radial flux motor, where the flux extends radially from the axis of rotation. However, a radial flux motor may be large in size and heavy, thereby increasing the size of the hoist and decreasing the hoist-lifting capacity. Another type of motor that may be used in the hoist and lift applications described above is an axial flux motor in which the flux in the air gap extends in a direction parallel to the axis of rotation of the rotor. An axial flux motor may include an integral brake design that may facilitate decreasing the size, weight, and cost of such hoist and lift systems.

BRIEF DESCRIPTION OF THE INVENTION

In one aspect, an axial flux electric machine is provided. The axial flux electric machine comprises a rotatable shaft, a stator core comprising a ferromagnetic material and defining an axis of rotation, and a rotor assembly comprising a plurality of permanent magnets. The rotor assembly is rotatable about the axis of rotation. An axial air gap is defined between the stator core and the rotor assembly. The rotor assembly is axially displaceable towards and away from the stator core. The rotor assembly has a first position wherein the axial gap is a predetermined width greater than zero, and a second position wherein the axial gap is zero, such that the rotor assembly and the stator core contact each other.

In another aspect, an axial flux electric machine comprises a stator assembly and a rotor assembly having an axial air gap defined between the stator assembly and the rotor assembly. The rotor assembly comprises an annular toothed ring. The annular toothed ring comprises a plurality of notches formed therein. The axial flux electric machine comprises an actuator configured to engage the rotor assembly to substantially prevent rotation of the rotor assembly. The axial flux electric machine also comprises a motor drive controller that is electrically coupled to the stator assembly and the actuator. The motor drive controller is configured to apply a voltage to the stator assembly and the actuator.

In yet another aspect, a method of assembling an axial flux electric machine having an integral brake is provided. The method comprises providing a stator assembly, providing a rotatable shaft, and coupling a rotor assembly to the rotatable shaft. The rotor assembly is axially displaceable towards and away from the stator assembly to vary an air gap defined therebetween. The method also comprises coupling a brake assembly to the axial flux electric machine. The brake assembly is configured to displace the rotor assembly between a first position wherein the axial gap is a predetermined width greater than zero, and a second position wherein the axial gap is zero, such that the rotor assembly and the stator assembly contact each other.

BRIEF DESCRIPTION OF THE DRAWINGS

Corresponding reference characters indicate corresponding parts throughout the several views of the drawings.

DETAILED DESCRIPTION OF THE INVENTION

Figure 1:
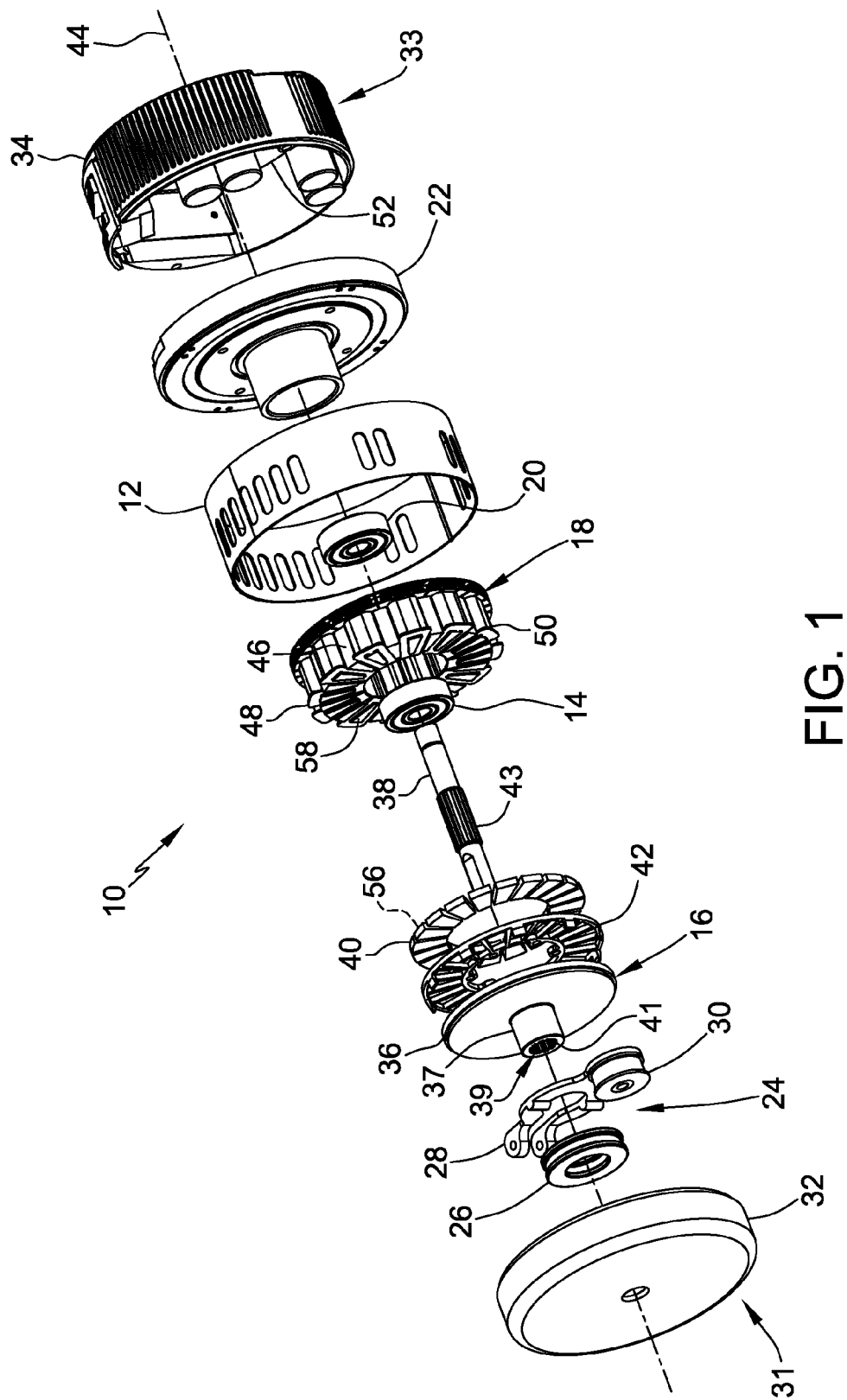
FIG. 1 is an exploded side view of an exemplary embodiment of an axial flux electric machine.
Figure 2:
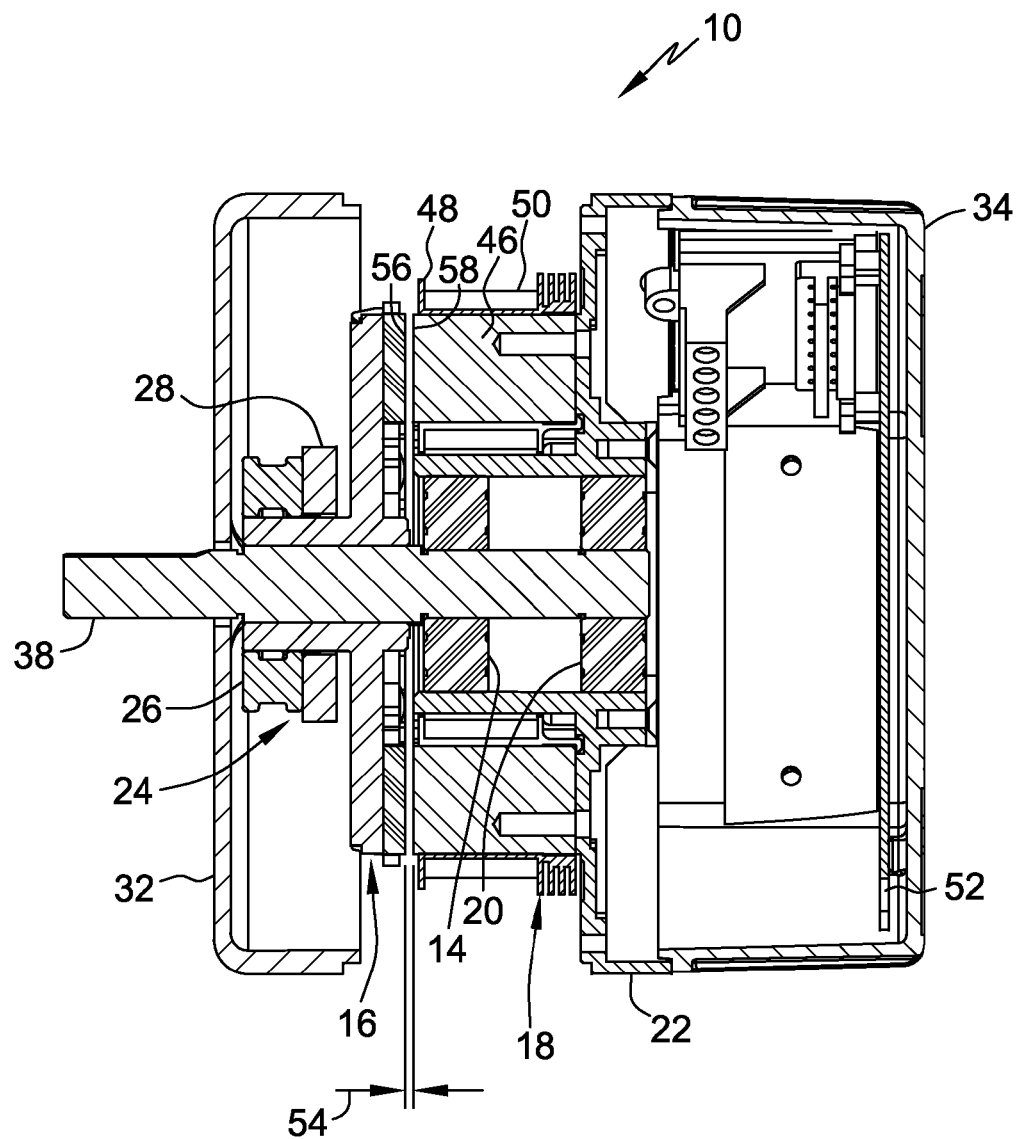
FIG. 2 is a side section view of the axial flux electric machine shown in FIG. 1, illustrating an axial air gap of the electric machine.

FIG. 1 is an exploded side view of an exemplary embodiment of an axial flux electric machine 10. FIG. 2 is a side cross-section view of axial flux electric machine 10 illustrating an axial air gap between a rotor assembly and a stator assembly of axial flux electric machine 10. In the exemplary embodiment, electric machine 10 is an electric motor, although, electric machine 10 may function as either an electric motor or an electric generator.

In the exemplary embodiment, electric machine 10 includes, at least in part, a vented housing 12, a first bearing assembly 14, a rotor assembly generally indicated at 16, a stator assembly generally indicated at 18, a second bearing assembly 20, and a mid-shield 22. Additionally, located proximate rotor assembly 16, electric machine 10 includes a brake assembly 24 including a release bearing 26, a bearing fork 28, and an actuator 30 for actuating brake assembly 24 to move rotor assembly 16 axially within electric machine 10. Covering a first end portion 31 of electric machine 10 is an endbell 32. Furthermore, a second end portion 33 of electric machine 10 includes a controller assembly 34.

In the exemplary embodiment, rotor assembly 16 includes a rotor plate 36 having a collar portion 37 extending therefrom. Collar portion 37 includes a splined hole 39 therethrough having a plurality of axial splines 41 formed therein. Rotor assembly 16 is splined onto a shaft 38 to impart rotation therewith and to enable it to slide axially in relation to an axis of rotation. In the exemplary embodiment, shaft 38 comprises a plurality of splines 43 extending substantially axially along at least a portion of shaft 38. Splines 43 are configured to slidingly couple to splines 41 of rotor plate 36. Alternatively, rotor assembly 16 may be coupled to shaft 38 in any manner that enables rotor assembly 16 to function as described herein.

In the exemplary embodiment, a plurality of permanent magnets 40 is coupled to rotor plate 36. Permanent magnets 40 are each coupled within rotor assembly 16 by a magnet retaining ring 42. In the exemplary embodiment, plurality of permanent magnets 40 are neodymium magnets. Alternatively, any suitable permanent magnet may be included that enables electric machine 10 to function as described herein. Rotor assembly 16 is rotatable within electric machine 10, and more specifically, rotatable within first bearing assembly 14 and second bearing assembly 20 about axis of rotation 44. First and second bearing assemblies 14 and 20 are disposed with mid-shield 22.

In the exemplary embodiment, stator assembly 18 includes a stator core 46 having a plurality of poles and a plurality of coil insulating members 48 (also referred to herein as bobbins). Each bobbin 48 includes a copper winding 50 would around an outer surface of each respective bobbin 48. Windings 50 are electrically coupled to an electrical connection board (not shown) for receiving electrical current thereby inducing an electromagnetic field about a pole of stator core 46. The electrical current may be provided by a motor drive controller 52 of controller assembly 34. In the exemplary embodiment, motor drive controller 52 is coupled to at least one winding 50 and is configured to apply a voltage with an associated frequency to one or more of windings 50 at a time for commutating windings in a preselected sequence to rotate rotor assembly 16 about axis of rotation 44. The electrical current can be an alternating current (AC). In the exemplary embodiment, motor drive controller 52 functions to both accelerate and decelerate rotor assembly 16.

In the exemplary embodiment, an air gap 54 is defined between outer surfaces 56 of plurality of permanent magnets 40 and outer surfaces 58 of stator core 46. A flux within electric machine 10 extends between plurality of permanent magnets 40 and stator core 46 in a direction parallel to axis of rotation 44. In the exemplary embodiment, each one of permanent magnets 40 is symmetrical to facilitate manufacturing a single magnet design for use with electric machine 10. Additionally, permanent magnets 40 have a substantially flat profile that facilitates reducing waste during manufacturing, and therefore, lowering cost. Alternatively, permanent magnets 40 include engagement features 57 (Shown in FIG. 17), for example, without limitation, radially-extending grooves or ridges such that permanent magnets 40 are configured to form an interdigitated configuration with stator core 46.

In the exemplary embodiment, stator core 46 is a laminated core. As defined herein, the laminated core is radially laminated, e.g., fabricated with a ribbon of material wound into a core, or a series of concentric rings stacked one inside the other to create a core of material, for example, soft iron or silicon steel. Alternatively, stator core 46 may be a solid core stator. A solid core may be a complete, one-piece component, or may include multiple non-laminated sections coupled together to form a complete solid core. A solid stator core may be fabricated from a magnetic material, such as, for example, a Soft Magnetic Alloy (SMA) or a Soft Magnetic Composite (SMC) material. Alternatively, stator core 46 may be fabricated from any ferromagnetic material that enables electric machine 10 to function as described herein, such as, for example, steel. The use of SMA or SMC materials in a solid core enable 3-dimensional flux paths and facilitate reducing high frequency losses (e.g., losses at frequencies above 60 Hz) when compared with laminated stator cores. The use of SMC or SMA materials also facilitates increasing control of air gap 54 (shown in FIG. 2), which facilitates improving performance and minimizing noise. In one suitable embodiment, outer surfaces 58 of stator core 46 include engagement features 59 (Shown in FIG. 17), for example, without limitation, radially-extending grooves or ridges that correspond with engagement features 57 of permanent magnets 40, such that stator core 46 is configured to form an interdigitated configuration with permanent magnets 40.

Figure 3:
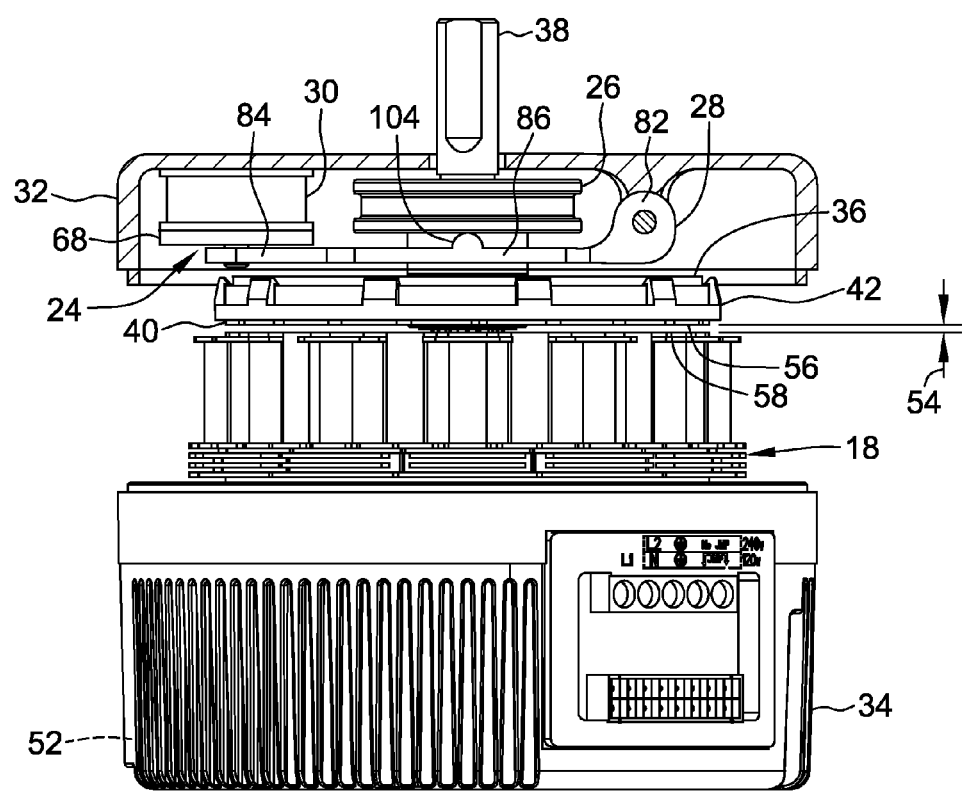
FIG. 3 is a partial section top view of the axial flux electric machine shown in FIG. 1, illustrating an exemplary brake assembly in a disengaged position.

FIG. 3 is a partial section top view of axial flux electric machine 10 illustrating brake assembly 24 in the disengaged position to set axial air gap 54 to a predetermined width. In general, actuator 30 is electrically coupled to motor drive controller 52 of controller assembly 34. Motor drive controller 52 is configured to apply an AC voltage or a direct current (DC) voltage to actuator 30 to activate actuator 30 to disengage brake assembly 24 substantially simultaneously with the application of voltage to one or more of windings 50 as described above. In the exemplary embodiment, disengagement of brake assembly 24 with rotor assembly 16 urges rotor assembly 16 away from stator assembly 18 to set axial air gap 54 to a predetermined width. (Detailed operation of brake assembly 24 will be described below.) The substantially simultaneous application of voltage and the associated frequency component to windings 50 causes rotor assembly 16 to rotate about axis of rotation 44. Motor drive controller 52 is configured to vary the amount of voltage and the frequency applied to windings 50 to cause electric machine 10 to rotate at various speeds. Furthermore, controller 52 is configured to provide dynamic braking to electric machine 10. In particular, controller 52 can apply voltage and an associated frequency component to one or more of windings 50 to provide braking to electric machine 10. When the rotation of electric machine 10 is ceased, controller 52 removes the voltage from windings 50 and actuator 30 to deactivate actuator 30 to engage brake assembly 24.

Figure 4:
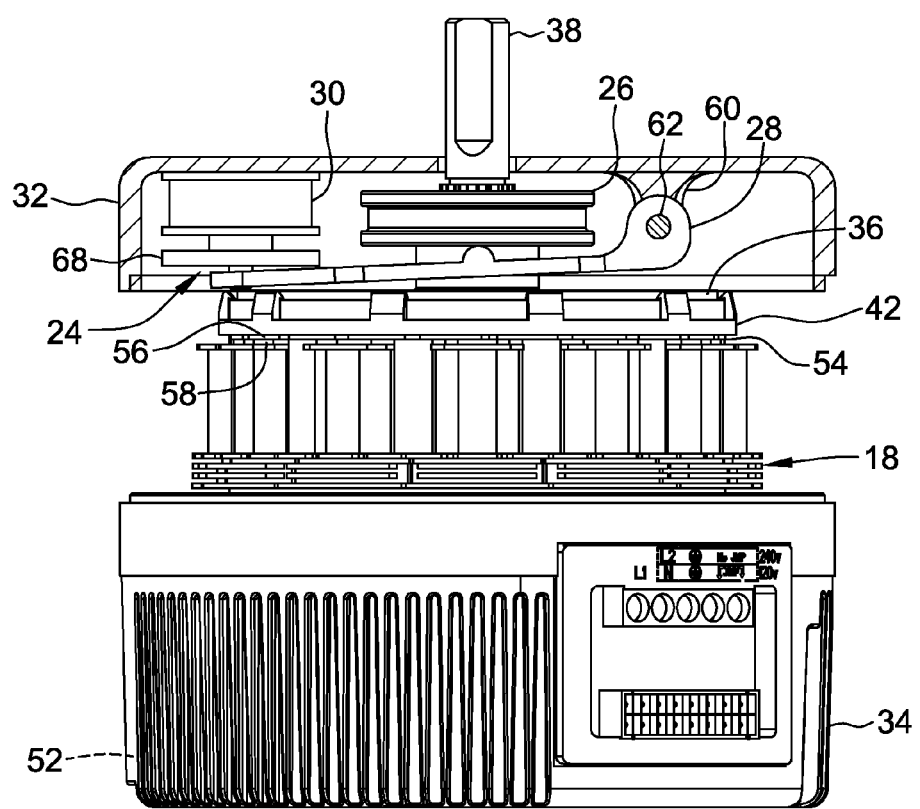
FIG. 4 is a partial section top view of the axial flux electric machine shown in FIG. 1, illustrating the brake assembly in an engaged position.

FIG. 4 is a partial section top view of axial flux electric machine 10 illustrating brake assembly 24 engaged to collapse axial air gap 54 to substantially zero. In the exemplary embodiment, when the rotation of electric machine 10 and the application of voltage to actuator 30 is stopped, the magnetic attraction force between permanent magnets 40 and stator core 46 across air gap 54 urges rotor assembly 16 toward stator assembly 18 until outer surfaces 56 of permanent magnets 40 and outer surfaces 58 of stator core 46 come into face-to-face contact with each other thus facilitating preventing rotation of rotor assembly 16 relative to stator assembly 18, i.e. braking electric machine 10. In the exemplary embodiment, controller 52 applies a DC voltage to one or more windings 50 such that the overall magnetic attraction force between permanent magnets 40 and stator core 46 is increased. The face-to-face contact due to the magnetic attraction force induces a static friction force between permanent magnets 40 and stator core 46 that must be overcome in order for electric machine to rotate. Increasing the magnetic attraction force also increases the static friction force, thus facilitating increasing the braking force of electric machine 10. In an alternative embodiment, outer surfaces 56 of permanent magnets 40 and outer surfaces 58 of stator core 46 have a friction material applied thereto to increase the static friction force therebetween, for example, without limitation, fiber composite, organic, semi-metallic, metallic, and resin friction materials known in the art.

In the exemplary embodiment, to initiate release of permanent magnets 40 from stator core 46, controller 52 reverses the polarity of the DC voltage to repel permanent magnets 40 from stator core 46 thereby releasing the braking of electric machine 10. The DC voltage also generates a holding torque preventing rotation of the rotor during this action.

Figure 5:
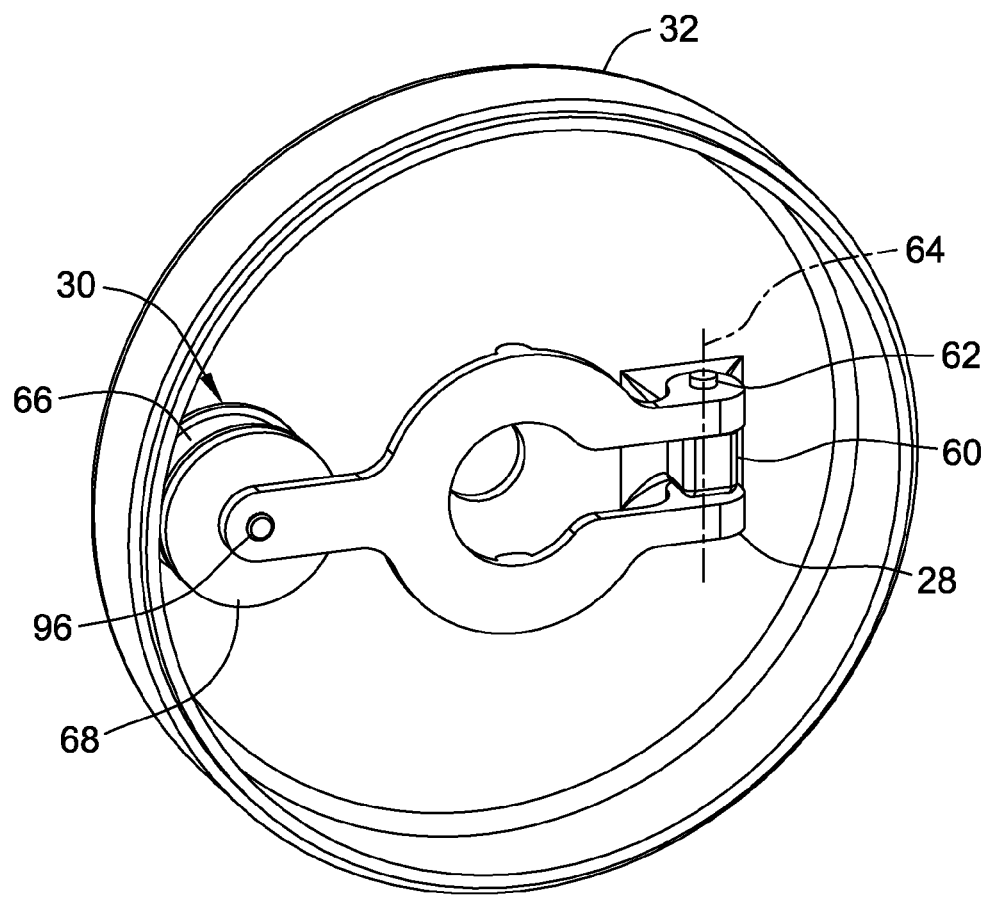
FIG. 5 is a perspective view of an endbell of the electric machine shown in FIG. 1 including an actuator and a fork of the brake assembly.

Referring now to FIGS. 5-10, brake assembly 24 and the components thereof will be described. FIG. 5 is a perspective view of endbell 32 including actuator 30 and fork 28 of brake assembly 24 attached thereto. The other components of electric machine 10 are not shown for clarity. In the exemplary embodiment, fork 28 is rotatably coupled to endbell 32 via a boss 60 of endbell 32 and a mechanical fastener 62. In the exemplary embodiment, mechanical fastener 62 is a pin configured to extend through fork 28 and boss 60. Alternatively, mechanical fastener 62 may be any type of fastener that enables rotatably coupling fork 28 to endbell 32, for example, without limitation, a threaded fastener, a shoulder bolt, etc. Mechanical fastener 62 passes substantially vertically through fork 28 and boss 60 such that fork 28 can pivot about a vertical axis of rotation 64.

Coupled to endbell 32 and fork 28, opposite vertical axis of rotation 64, is actuator 30. In the exemplary embodiment, actuator 30 is a solenoid and comprises a coil portion 66 and a plunger 68. Coil portion 66 may be fixedly coupled to endbell 32 using any method that enables actuator 30 to operate as described herein, such as using mechanical fasteners (not shown). Plunger 68 is slidably coupled to coil portion 66 such that plunger 68 moves in a direction substantially parallel to axis of rotation 44, i.e., the rotation axis of electric machine 10. In the exemplary embodiment, plunger 68, in addition to being slidably coupled to coil portion 66, is coupled to fork 28. In operation, as plunger 68 slides axially with respect to coil portion 66, it pulls on an end of fork 28 such that fork 28 pivots about vertical axis of rotation 64.

Figure 6:
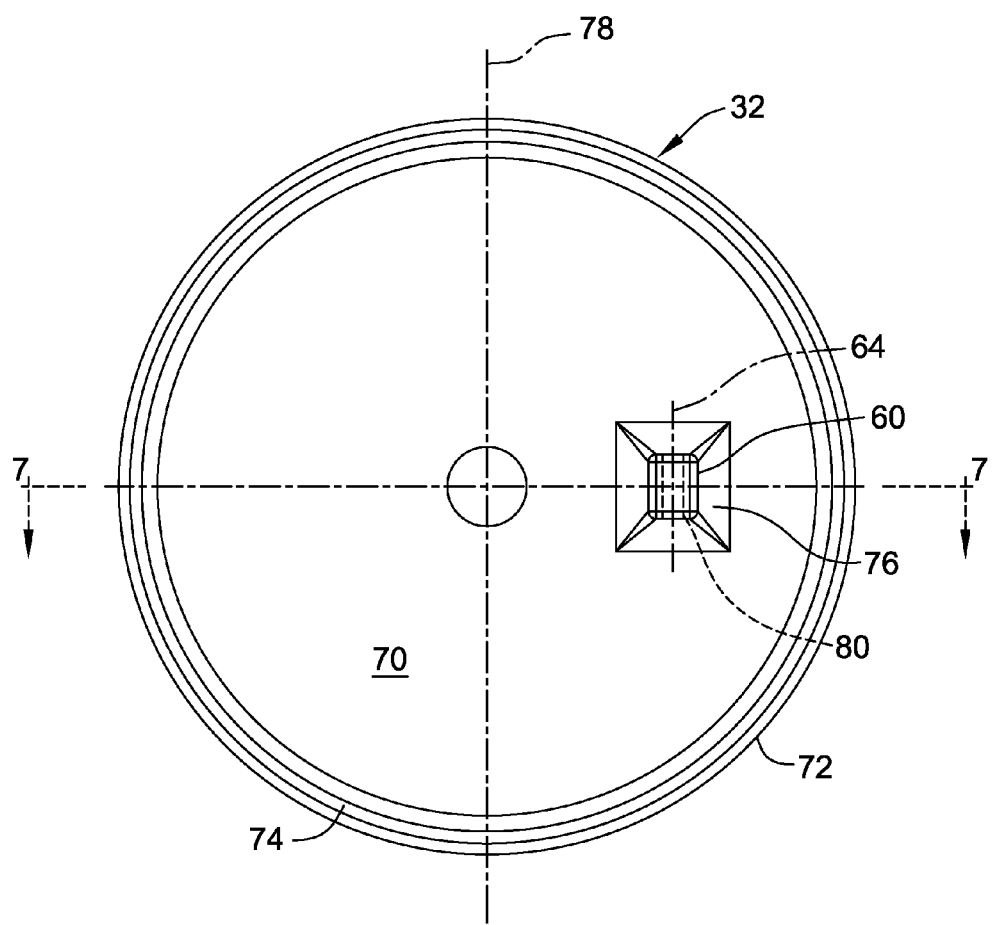
FIG. 6 is an end view of the endbell shown in FIG. 5.
Figure 7:
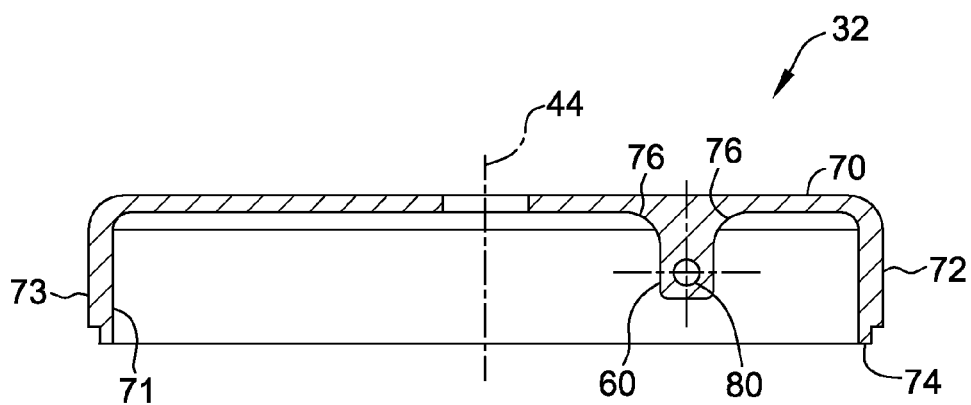
FIG. 7 is a section view of the endbell taken about line 7-7 shown in FIG. 6.

FIG. 6 is an end view of endbell 32. FIG. 7 is a section view taken about line 7-7 shown in FIG. 6. In the exemplary embodiment, endbell 32 is substantially circular in shape having a rear wall 70 and an annular rim 72 extending outward therefrom. Rim 72 extends substantially perpendicular to rear wall 70 and includes an inner surface 71 and an outer surface 73. A centerline axis defined by endbell 32 substantially corresponds to axis of rotation 44. Extending outward from rim 72 is a lip 74. An inner surface of lip 74 is defined by inner surface 71 of rim 72. Lip 74 is approximately half as wide as rim 72 and is configured as a step for interfacing with vented housing 12 of electric machine 10.

In the exemplary embodiment, boss 60 extends outward from rear wall 70 in the same direction as rim 72. Boss 60 is rectangular in shape and includes transition fillets 76 with rear wall 70. As illustrated in FIGS. 6 and 7, boss 60 is offset horizontally with respect to a central vertical axis 78 of endbell 32 and is substantially center about a central horizontal line 7-7, shown in FIG. 6. In an alternative embodiment, boss 60 may be positioned on endbell 32 in any position that enables endbell 32 to function as described herein. Furthermore, boss 60 may be fabricated in any shape that enables boss 60 to function as described herein.

In the exemplary embodiment, boss 60 includes a circular hole 80 defined therethrough. Hole 80 is bored substantially vertically through boss 60, thereby defining vertical axis of rotation 64. As best illustrated in FIG. 7, hole 80 is offset from rear wall 70 and is offset horizontally from axis of rotation 44. The size and position of hole 80 is configured to enable operation of fork 28 of brake assembly 24 as further described herein. In at least some embodiments, endbell 32 is manufactured from iron, steel, non-ferrous metal, and/or molded plastic. Endbell 32, however, may be fabricated from any material that enables electric machine 10 to function as described herein. Furthermore, endbell 32 may be stamped, forged, drawn, or formed using any other suitable manufacturing process to fabricate endbell 32.

Figure 8:
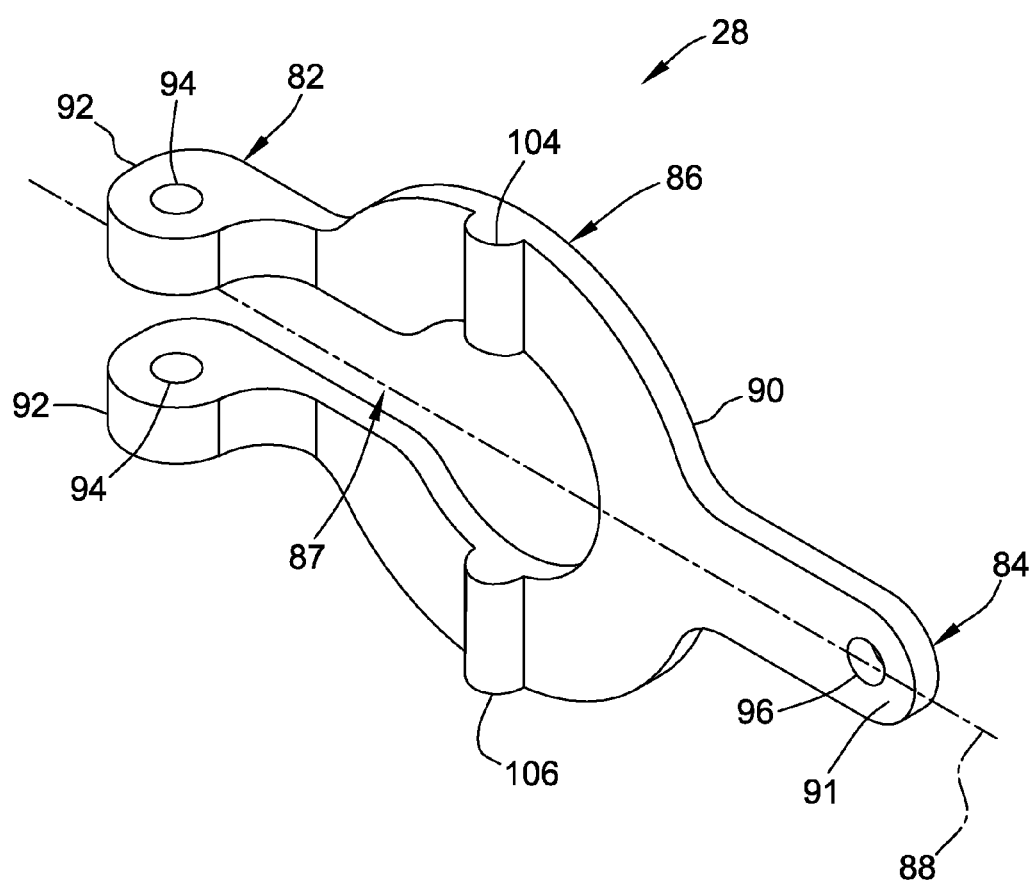
FIG. 8 is a perspective of the fork for use with the brake assembly as shown in FIG. 5.
Figure 9:
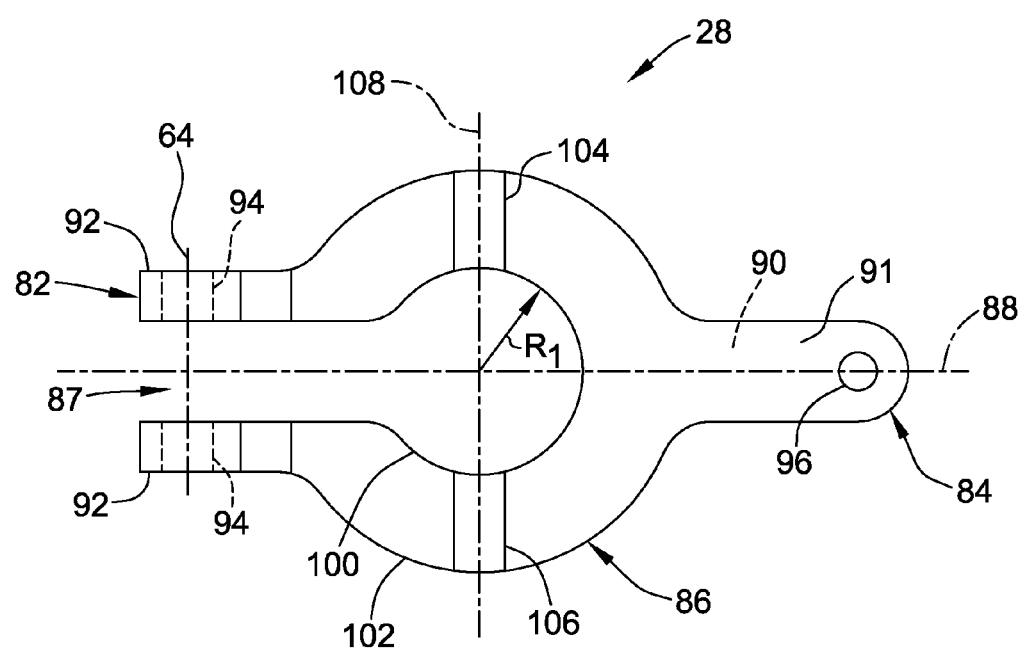
FIG. 9 is a front view of the fork shown in FIG. 8.
Figure 10:
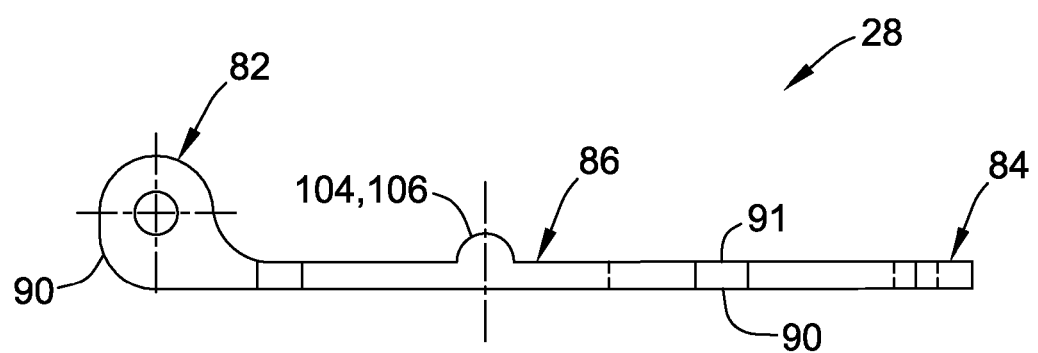
FIG. 10 is a bottom view of fork shown in FIG. 8.

FIG. 8 is a perspective of fork 28 for use with brake assembly 24, FIG. 9 is a front view of fork 28, and FIG. 10 is a bottom view of fork 28. In the exemplary embodiment, fork 28 has a first end potion 82, a second end portion 84, and a center portion 86. Furthermore, fork 28 includes a longitudinal axis 88 that runs from first end portion 82 to second end portion 84 such that fork 28 is substantially mirrored vertically about longitudinal axis 88 with respect to FIG. 8.

In the exemplary embodiment, fork 28 includes a substantially flat rear surface 90 and a front surface 91. Center portion 86 is substantially C-shaped having an open area 87 opening toward first end portion 82. Center portion 86 comprises an inner curved edge 100 and an outer curved edge 102 that is substantially concentric with inner curved edge 100. Inner curved edge 100 has a radius R1 that is sized such that center portion 86 can fit around collar portion 37 of rotor plate 36 without contact during operation of brake assembly 24. Extending outward from front surface 91 are two bosses 104 and 106, each being a mirror of the other with respect to longitudinal axis 88. As best illustrated in FIG. 9, bosses 104 and 106 extend substantially vertically between inner curved edge 100 and outer curved edge 102, and are centered about a vertical axis 108 that passes through the center point of inner curved edge 100. With reference to FIG. 10, bosses 104 and 106 have a semicircular cross-section to facilitate reducing a contact area between bosses 104, 106 and release bearing 26. Alternatively, bosses 104 and 106 can have other cross-sectional shapes that enable fork 28 to function as described herein.

In the exemplary embodiment, first end portion 82 is forked into two shank ends 92 that, as best seen in FIG. 9, extend outward from front surface 91. Each of shank ends 92 has a hole 94 defined vertically therethrough. Holes 94 are substantially vertically aligned and have a collinear central axis that substantially corresponds to vertical axis of rotation 64 defined by boss 60 of endbell 32. Second end portion 84 is substantially flat and includes a hole 96 that extends therethrough substantially perpendicular to front and rear surfaces 91 and 90. As illustrated in FIG. 5, hole 96 is sized such that fork 28 can couple to plunger 68 of actuator 30 via hole 96.

Figure 11:
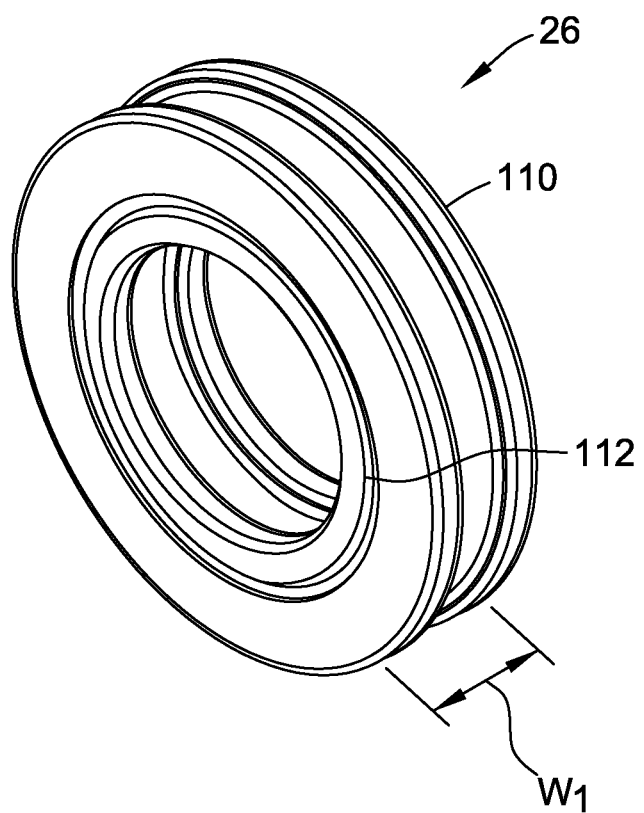
FIG. 11 is a perspective view of a release bearing for use with the electric machine shown in FIG. 1.
Figure 12:
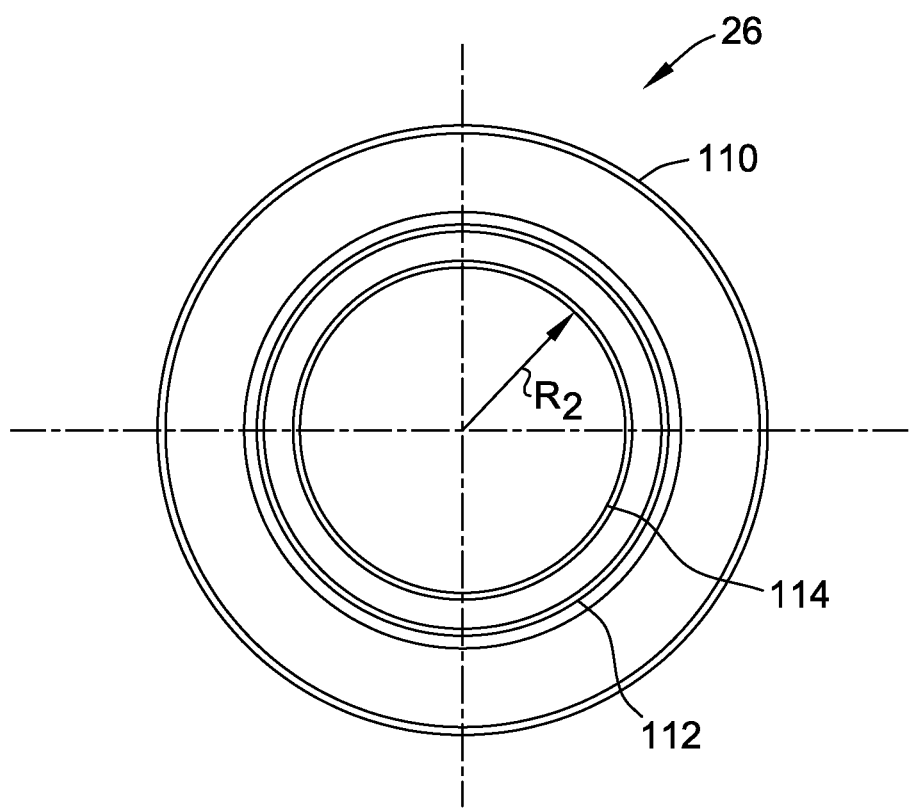
FIG. 12 is a front view of the release bearing shown in FIG. 11.

FIG. 11 is a perspective view of release bearing 26 for use with brake assembly 24. FIG. 12 is a front view of release bearing 26. Release bearing 26 is thrust bearing that enables rotation between bearing parts about a central axis, but supports an axial load. In the exemplary embodiment, release bearing 26 comprises an outer ring 110 and a concentric inner ring 112 bearing coupled to outer ring 110. Inner ring 112 and outer ring 110 have substantially the same width W1. Outer ring 110 is configured to rotate concentrically about inner ring 112. Inner ring 112 has an annular inner surface 114 having a radius R2. In the exemplary embodiment, release bearing 26 couples to rotor plate 36. Specifically, inner ring 112 is configured to fixedly couple to collar portion 37 of rotor plate 36. Accordingly, radius R2 is sized such that inner surface 114 of inner ring 112 provides an interference fit with rotor assembly 16. Alternatively, Release bearing 26 can be coupled to rotor assembly 16 in any manner that enables release bearing 26 to operate as described herein.

Referring back to FIGS. 3 and 4, in operation, brake assembly 24 is actuated to open and close air gap 54 of electric machine 10. As illustrated in FIG. 3, fork 28 is positioned such that inner curved edge 100 of center portion 86 surrounds collar portion 37 of rotor plate 36. Fork 28 is orientated such that first surface 91 face in the direction of first end portion 31 of electric machine 10. Release bearing 26 is coupled to collar portion 37 such that fork 28 is between release bearing 26 and plate 36. Fork 28 is pivotably coupled to endbell 32 via boss 60 by use of mechanical fastener 62. Actuator 30 is coupled to endbell 32 proximate second end portion 84 of fork 28. Plunger 68 is coupled to hole 96 in second end portion 84. Controller 52 is electrically coupled to actuator 30 and is configured to apply an AC or a DC voltage to actuator 30.

In the exemplary embodiment, when the voltage is applied to actuator 30, plunger 68 is pulled into coil portion 66. Plunger 68 thereby applies a substantially axial force to second end portion 84 of fork 28. In response to the force applied by plunger 68, fork 28 pivots about mechanical fastener 62 toward first end portion 31 of electric machine 10, thereby opening air gap 54 to a predetermined width. In the exemplary embodiment, as fork 28 pivots, bosses 104 and 106 contact outer ring 110 of release bearing 26 thereby sliding rotor assembly 16 axially along shaft 38 to open air gap 54 to a predetermined width. Alternatively, where rotor assembly 16 and shaft 38 are coupled together, as fork 28 pivots, rotor shaft 38 may slide axially within first and second bearing assemblies 14 and 20 to open air gap 54 to a predetermined width. In a further alternative embodiment, fork 28 may cause rotor assembly 16, shaft 38, and first and second bearing assemblies 14 and 20 to slide axially within mid-shield 22 to open air gap 54 to a predetermined width.

With reference to FIG. 4, when controller 52 removes the voltage from actuator 30, plunger 68 is released from coil portion 66. The magnetic attraction between permanent magnets 40 and stator core 46 generates a force that pulls rotor assembly 16 into face-to-face contact with stator assembly 18, thereby collapsing air gap 54 to substantially zero. In response, release bearing 26 moves axially away from first end portion 31 of electric machine 10. Outer ring 110 of release bearing 26 contacts bosses 104 and 106, which causes fork 28 to pivot about mechanical fastener 62 away from first end portion 31. In another embodiment, controller 52 applies a DC voltage to stator assembly 18 to facilitate increasing the magnetic attraction force between permanent magnets 40 and stator core 46.

Figure 17:
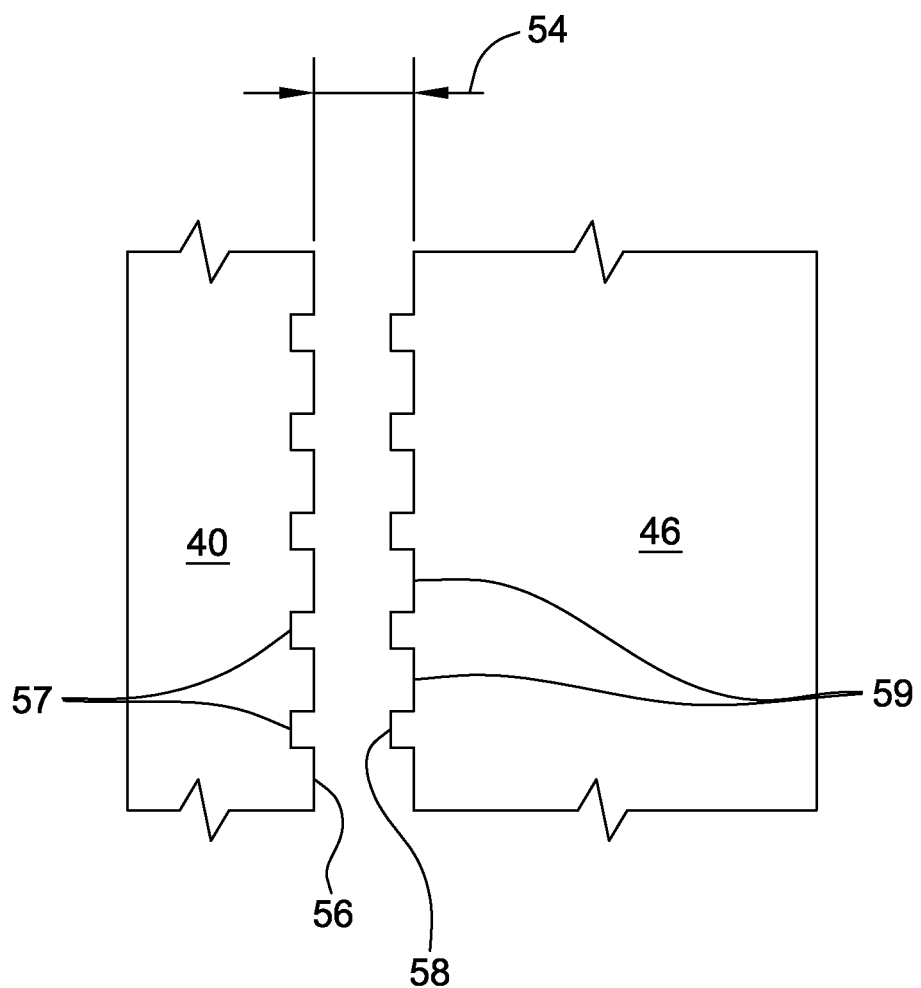
FIG. 17 is a side view of a permanent magnets and the stator core of the axial flux electric machine shown in FIG. 1, illustrating grooves configured to form an interdigitated configuration.

In the exemplary embodiment, brake assembly 24 is arranged in a "failsafe" configuration, such that when electric machine 10 loses electrical power, the braking action is actuated, i.e., air gap 54 is collapsed, because actuator 30 releases plunger 68 and the magnetic attraction force between permanent magnets 40 and stator core 46 pull rotor assembly 16 and stator assembly 18 into face-to-face contact. In an alternative embodiment, as seen in FIG. 17, permanent magnets 40 and outer surfaces 58 of stator core 46 are configured to form an interdigitated configuration to further enhance the braking effect of electric machine 10.

In another suitable embodiment shown in FIGS. 13-16, an axial flux electric machine 200 includes, at least in part, vented housing 12, first bearing assembly 14, stator assembly 18, second bearing assembly 20, and mid-shield 22. Electric machine 200 also includes a lockable rotor assembly, generally indicated at 210. Located proximate rotor assembly 210, electric machine 200 includes a locking actuator 220 configured to lock rotor assembly 210 in place within electric machine 200, thereby preventing unwanted rotation of rotor assembly 210 when power is removed from electric machine 200. Covering first end portion 31 of electric machine 200 is endbell 32. Furthermore, second end portion 33 of electric machine 200 includes controller assembly 34.

Rotor assembly 210 includes a rotor plate 212 that is coupled to a shaft 214 for rotation therewith. Permanent magnets 40 are coupled to rotor plate 212. Permanent magnets 40 are each coupled within rotor assembly 210 by magnet retaining ring 42. In the illustrated embodiment, permanent magnets 40 are neodymium magnets. Alternatively, any suitable permanent magnet may be included that enables electric machine 10 to function as described herein. Rotor assembly 210 is rotatable within electric machine 200, and more specifically, rotatable within first bearing assembly 14 and second bearing assembly 20 about axis of rotation 44. First and second bearing assemblies 14 and 20 are disposed with mid-shield 22.

Figure 14:
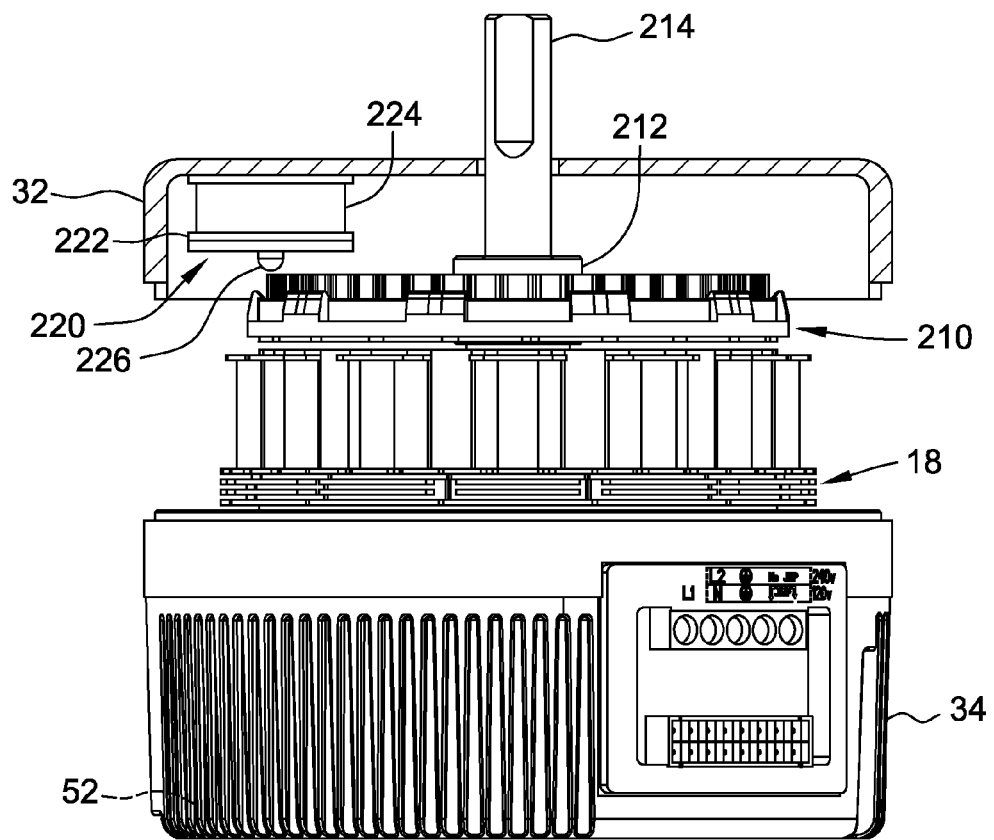
FIG. 14 is a partial section top view of the axial flux electric machine shown in FIG. 13, illustrating a locking actuator in a disengaged position.

FIG. 14 is a partial section top view of axial flux electric machine 200 illustrating locking actuator 220 in the disengaged position to enable rotor assembly 210 to rotate freely within electric machine 200. In general, locking actuator 220 is electrically coupled to motor drive controller 52 of controller assembly 34. Motor drive controller 52 is configured to apply an AC voltage or a direct current (DC) voltage along to locking actuator 220 to activate locking actuator 220 to disengage rotor assembly 210 substantially simultaneously with the application of voltage to one or more of windings 50 as described above. Disengagement of locking actuator 220 from rotor assembly 210 enables rotor assembly 210 to freely rotate about axis of rotation 44.

The substantially simultaneous application of voltage and the associated frequency component to windings 50 causes rotor assembly 210 to rotate about axis of rotation 44. Motor drive controller 52 is configured to vary the amount of voltage and the frequency applied to windings 50 to cause electric machine 200 to rotate at various speeds. Furthermore, controller 52 is configured to provide dynamic braking to electric machine 200. In particular, controller 52 can apply voltage and an associated frequency component to one or more of windings 50 to provide dynamic braking to electric machine 200. When the rotation of electric machine 200 is ceased, controller 52 removes the voltage from windings 50 and locking actuator 220 to deactivate locking actuator 220 to lock rotor assembly 210 in place.

Figure 15:
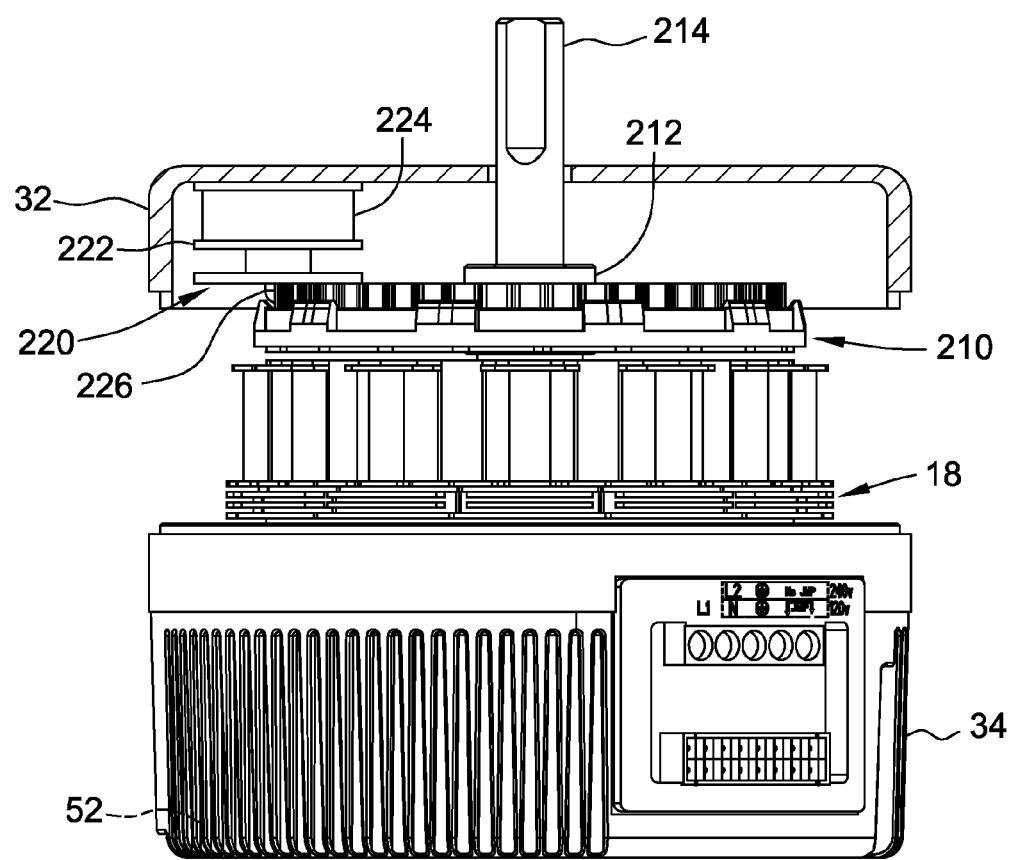
FIG. 15 is a partial section top view of the axial flux electric machine shown in FIG. 13, illustrating the locking actuator in an engaged position.

FIG. 15 is a partial section top view of axial flux electric machine 200 illustrating locking actuator 220 engaged with rotor assembly 210. When the rotation of electric machine 200 and the application of voltage to locking actuator 220 are stopped, a plunger 222 of locking actuator 220 engages rotor plate 212 to lock it in place, thus facilitating preventing rotation of rotor assembly 210 relative to stator assembly 18, i.e. braking electric machine 200. As seen in FIG. 15, locking actuator 220 is coupled to endbell 32. In one suitable embodiment, locking actuator 220 is a solenoid and comprises a coil portion 224 and the plunger 222. Coil portion 224 is fixedly coupled to endbell 32 using any method that enables locking actuator 220 to operate as described herein, such as using mechanical fasteners (not shown). Plunger 222 is slidably coupled to coil portion 224 such that plunger 222 moves in a direction substantially parallel to axis of rotation 44, i.e., the rotation axis of electric machine 200. In operation, as plunger 222 slides axially with respect to coil portion 224, it moves a tip portion 226 into and out of engagement with rotor plate 212.

Figure 13:
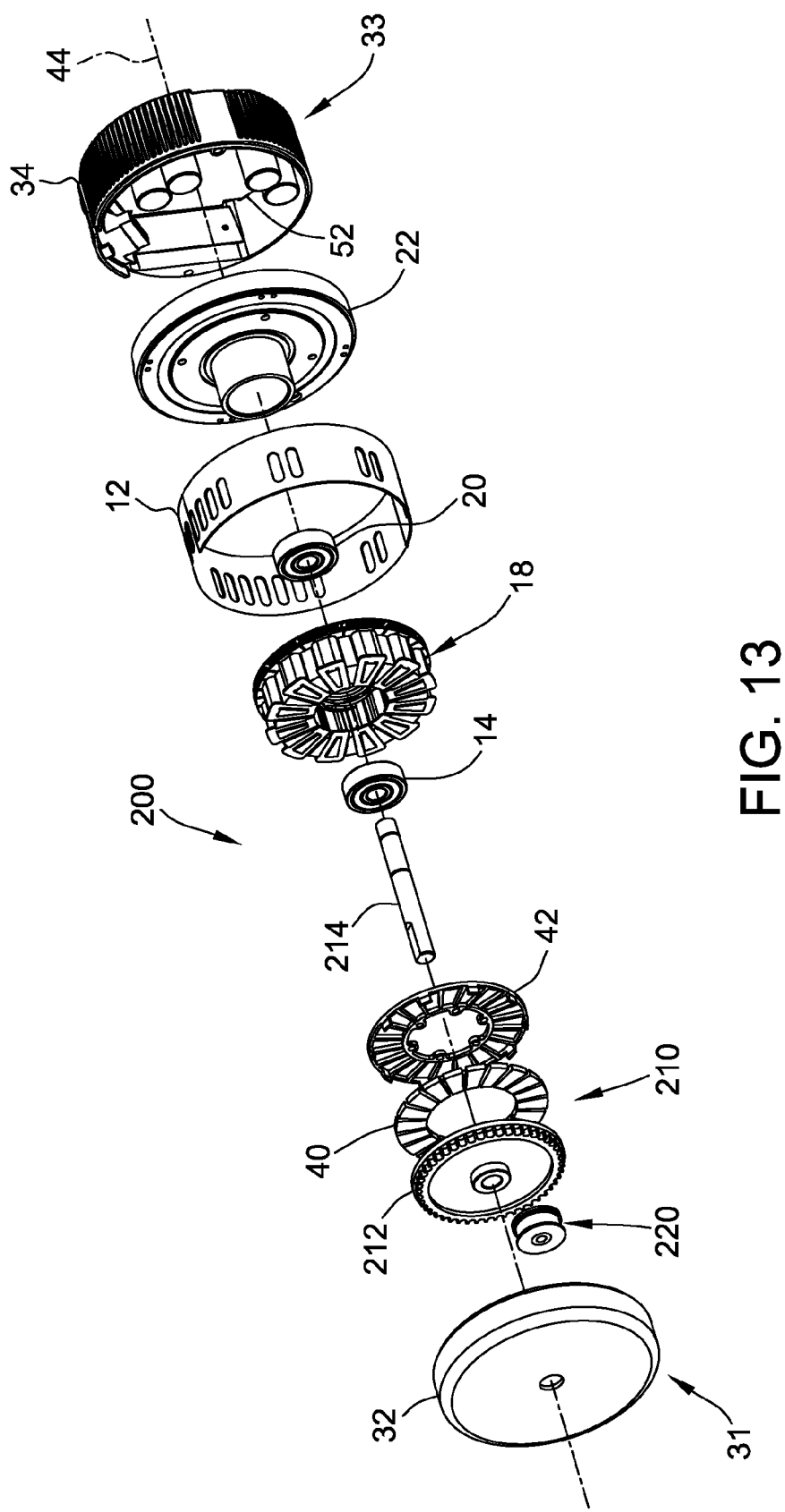
FIG. 13 is an exploded side view of an alternative axial flux electric machine.
Figure 16:
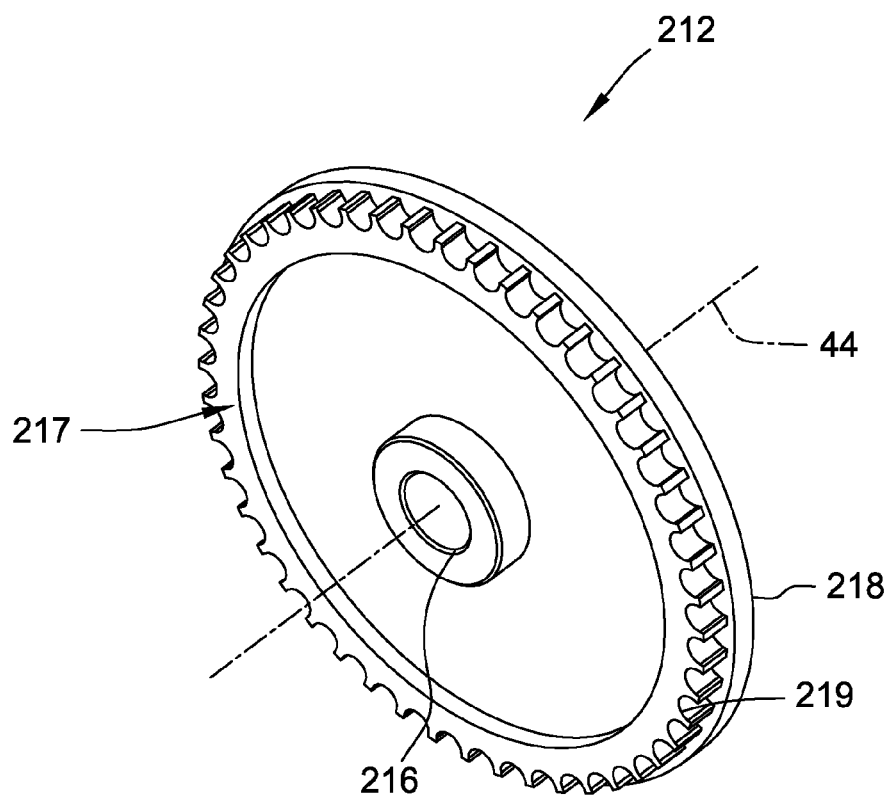
FIG. 16 is a perspective view of a rotor plate for use with the axial flux electric machine shown in FIG. 13.

FIG. 16 is a perspective view of an exemplary embodiment of a rotor plate 212 that may be included within electric machine 200 (shown in FIGS. 13-15). In the exemplary embodiment, rotor plate 212 a shaft opening 216. Shaft opening 216 is concentric with axis of rotation 44 and is configured to receive a shaft, for example, shaft 214 (shown in FIG. 13). Rotor plate 212 includes an outer rim 218 spaced radially outward from shaft opening 216. Outer rim 218 is configured to engage with magnet retaining ring 42 (shown in FIG. 13) to secure permanent magnets 40 (shown in FIG. 13) to rotor plate 212. Rotor plate 212 also includes an annular toothed ring 217 having a plurality of notches 219 spaced radially inward of outer rim 218 and opening radially outward from axis of rotation 44. In the exemplary embodiment, each of notches 219 is substantially semi-circular in shape. Alternatively, notches 219 may be any shape that enables rotor plate 212 to function as described herein.

In the exemplary embodiment, the rotor plate 212 is fabricated using a sintering process from, for example, SMA or SMC materials. Alternatively, rotor plate 212 may be machined and/or cast from any material that enables rotor plate 212 to function as described herein, such as, for example, steel.

Referring back to FIGS. 14 and 15, in operation, locking actuator 220 is actuated to lock and unlock rotor assembly 210 of electric machine 200. As illustrated in FIG. 14, locking actuator 220 is disengaged from rotor plate 212, i.e., plunger 222 is retracted into coil portion 224. Locking actuator 220 is coupled to endbell 32 such that plunger tip portion 226 is substantially aligned with notches 219 of rotor plate 212. Controller 52 is electrically coupled to locking actuator 220 and is configured to apply an AC or a DC voltage to locking actuator 220. When the voltage is applied to locking actuator 220, plunger 222 is pulled into coil portion 224, thereby withdrawing plunger tip portion 226 from notches 219, thus enabling rotor assembly 210 to freely rotate with respect to stator assembly 18.

With reference to FIG. 14, when controller 52 removes the voltage from locking actuator 220, plunger 222 is released from coil portion 224. An internal spring (not shown) of locking actuator 220 pushes plunger 222 substantially axially away from coil portion 224. In response, plunger tip portion 226 moves axially towards and engages with one of notches 219 of rotor plate 212.

In the exemplary embodiment, locking actuator 220 is arranged in a "failsafe" configuration, such that when electric machine 200 loses electrical power, the rotation locking action is actuated, i.e., locking actuator 220 releases plunger 222 and the internal spring pushes plunger tip portion 226 into engagement with one of notches 219 of rotor plate 212.

Reference is made herein to the accompanying FIGS. 1-4 and 13-16 briefly described above, which show by way of illustration various embodiments of axial flux electric machines. The features shown in FIGS. 1-4 and 13-16 are exemplary features provided for enablement purposes, and are not intended to limit the scope of any embodiment of the claimed systems and methods for axial flux electrical machines having integral braking mechanisms. Persons of ordinary skill in the above-referenced technological field will recognize that other embodiments may be utilized, and that various changes may be made to the embodiments depicted in FIGS. 1-4 and 13-16 without departing from the scope of the claimed systems and methods. Such persons will appreciate that features described with respect to one embodiment can be applied to other embodiments, and that one or more embodiments may comprise features of one of FIGS. 1-4 and 13-16 that are combined with features of others of FIGS. 1-4 and 13-16. Thus, the scope of each embodiment of the invention is to be properly construed with reference to the claims.

Described herein are exemplary systems and methods for axial flux electrical machines having an integral braking mechanism. In one suitable embodiment, the axial flux machine includes a rotor splined to a shaft for axial displacement therewith. In another suitable embodiment, an axial flux machine includes a rotor assembly that can move axially within the machine. The axial flux machines further include a brake assembly that can be actuated by a motor controller to collapse the air gap of the axial flux machines. The axial displacement of the rotor enables the axial flux machines to collapse the air gap and use the attraction force between the rotor and the stator to apply a braking force to the machines. Furthermore, in one suitable embodiment, the axial machines include a pin configured to engage the rotor to further facilitate preventing rotation of the rotor. Collapsing the air gap of the axial flux machines enables the machines to incorporate a braking mechanism integral with the machine, thereby facilitating the assembly of an electric machine having a decreased size, weight, and cost when compared to known brake motors. Accordingly, a more compact, lightweight, and lower-cost axial flux machine is described herein that provides integral failsafe braking.

In another suitable embodiment, the axial flux machines include a rotor plate having a number of notches formed therein. The axial flux machines also include a locking actuator including a pin that engages the rotor notches to prevent rotation of the rotor. Locking the rotor of the axial flux machines enables the machines to incorporate a locking mechanism integral with the machine, thereby facilitating the assembly of an electric machine having a decreased size, weight, and cost when compared to known brake motors. Accordingly, a more compact, lightweight, and lower-cost axial flux machine is described herein that provides integral failsafe braking.

Exemplary embodiments of the axial flux electric machine are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An axial flux electric machine comprising:
   a rotatable shaft;
   a stator core comprising a ferromagnetic material and defining an axis of rotation;
   a rotor assembly comprising a plurality of permanent magnets, said rotor assembly rotatable about said axis of rotation;
   an axial air gap defined between said stator core and said rotor assembly, said rotor assembly being axially displaceable towards and away from said stator core, said rotor assembly has a first position wherein said axial gap is a predetermined width greater than zero, and a second position wherein said axial gap is zero, such that said rotor assembly and said stator core contact each other; and
   a brake assembly configured to displace said rotor assembly between the first position and the second position, said brake assembly comprising:
   a release bearing coupled to said rotor assembly;
   an endbell configured to couple to a housing of said axial flux electric machine;
   a fork pivotably coupled to said endbell, said fork configured to engage said release bearing to displace said rotor assembly between the first position and the second position; and
   a first actuator coupled between said endbell and said fork, said first actuator configured to control displacement of said fork.

2. The axial flux electric machine of claim 1, wherein said rotatable shaft comprises a first plurality of splines extending substantially axially along at least a portion of said rotatable shaft, and wherein said rotor assembly further comprises a hole extending therethrough, said hole comprising a second plurality of splines formed therein and complementary to said first plurality of splines.

3. The axial flux electric machine of claim 1, wherein each of said plurality of permanent magnets has an outer surface, each said outer surface comprises a plurality of first engagement features defined therein, wherein said stator core has an outer surface comprising a plurality of second engagement features defined therein and complementary to said plurality of first engagement features, and wherein said plurality of permanent magnets and said stator core are configured to couple together in form-fitting engagement, such that said plurality of first engagement features and said plurality of second engagement features form an interdigitated configuration when said rotor assembly is moved to the second position.

4. The axial flux electric machine of claim 1, wherein said fork comprises a pair of outward extending bosses configured to engage said release bearing.

5. The axial flux electric machine of claim 4, wherein said pair of outward extending bosses are semicircular to facilitate reducing a contact area between said pair of bosses and said release bearing.

6. The axial flux electric machine of claim 1 further comprising a motor drive controller electrically coupled to said stator assembly and said first actuator, said motor drive controller configured to apply a voltage to said stator assembly and said first actuator.

7. The axial flux electric machine of claim 6, wherein in use, application of the voltage to said first actuator by said motor drive controller activates said first actuator to displace said fork such that said rotor assembly is moved to the first position.

8. The axial flux electric machine of claim 6, wherein in use, removal of the voltage to said first actuator by said motor drive controller deactivates said first actuator, wherein a magnetic attraction force between said plurality of permanent magnets and said stator assembly causes said rotor assembly to be moved to the second position.

9. The axial flux electric machine of claim 6, wherein said motor drive controller is configured to apply a DC voltage to said stator assembly, the DC voltage facilitating increasing the magnetic attraction force between said plurality of permanent magnets and said stator assembly.

10. The axial flux electric machine of claim 6, wherein said motor drive controller is configured to apply a DC voltage to said stator assembly, the DC voltage configured to repel said plurality of permanent magnets from said stator assembly.

11. The axial flux electric machine of claim 6 further comprising a second actuator configured to engage said rotor assembly to substantially prevent rotation thereof, wherein said rotor assembly further comprises an annular toothed ring comprising a plurality of notches formed therein.

12. The axial flux electric machine of claim 11, wherein said second actuator comprises a coil portion and a plunger comprising a tip portion, wherein said motor drive controller is electrically coupled to said second actuator, said motor drive controller configured to apply a voltage to said second actuator, and wherein in use, application of the voltage to said second actuator activates said second actuator to displace said plunger axially towards said rotor assembly, said plunger configured to engage one of said plurality of notches with said tip portion such that said rotor assembly is substantially prevented from rotating.

13. The axial flux electric machine of claim 11, wherein said second actuator comprises a coil portion and a plunger comprising a tip portion, wherein said motor drive controller is electrically coupled to said second actuator, said motor drive controller configured to apply a voltage to said second actuator, and wherein in use, application of the voltage to said second actuator activates said second actuator to displace said plunger axially away said rotor assembly, said plunger configured to disengage one of said plurality of notches such that said rotor assembly is enabled to rotate.

14. An axial flux electric machine comprising:
a stator assembly; and
a rotor assembly having an axial air gap defined between said stator assembly and said rotor assembly, said rotor assembly comprising:
    an annular toothed ring comprising a plurality of notches formed therein;
    an actuator configured to engage said rotor assembly to substantially prevent rotation thereof, said actuator comprising a coil portion and a plunger comprising a tip portion; and
    a motor drive controller electrically coupled to said actuator, said motor drive controller configured to apply a voltage to said actuator, wherein application of the voltage to said actuator by said motor drive controller activates said actuator to displace said plunger axially towards said rotor assembly, said plunger configured to engage one of said plurality of notches with said tip portion such that said rotor assembly is substantially prevented from rotating.

15. The axial flux electric machine of claim 14, wherein application of the voltage to said actuator by said motor drive controller activates said actuator to displace said plunger axially away said rotor assembly, said plunger configured to disengage one of said plurality of notches such that said rotor assembly is enabled to rotate.

16. A method of assembling an axial flux electric machine having an integral brake, said method comprising:
    providing a stator assembly;
    providing a rotatable shaft;
    coupling a rotor assembly to the rotatable shaft, wherein the rotor assembly includes a plurality of permanent magnets and is axially displaceable towards and away from the stator assembly to vary an air gap defined therebetween; and
    coupling a brake assembly to the axial flux electric machine, wherein the brake assembly is configured to displace the rotor assembly between a first position wherein the axial gap is a predetermined width greater than zero, and a second position wherein the axial gap is zero such that the rotor assembly and the stator assembly contact each other, and wherein coupling the brake assembly comprises:
        coupling a release bearing to the rotor assembly;
        pivotably coupling a fork to an endbell of the axial flux electric machine; and
        coupling an actuator between the endbell and the fork, wherein the fork is configured to engage the release bearing to displace the rotor assembly between the first position and the second position.

17. The method of claim 16 further comprising electrically coupling a motor drive controller to the stator assembly and the brake assembly, wherein the motor drive controller is configured to apply a voltage to the stator assembly and the brake assembly.

18. The method of claim 16 further comprising forming a first plurality of splines substantially axially along at least a portion of the rotatable shaft, and forming a complementary second plurality of splines on the rotor assembly, wherein the first plurality of splines and the second plurality of splines are configured to impart rotation therewith and to enable the rotor assembly to move axially along the rotatable shaft.

* * * * *